S. C. MINEAR.
Machine for Compressing Grain-Shocks.
No. 166,624. Patented Aug. 10, 1875.
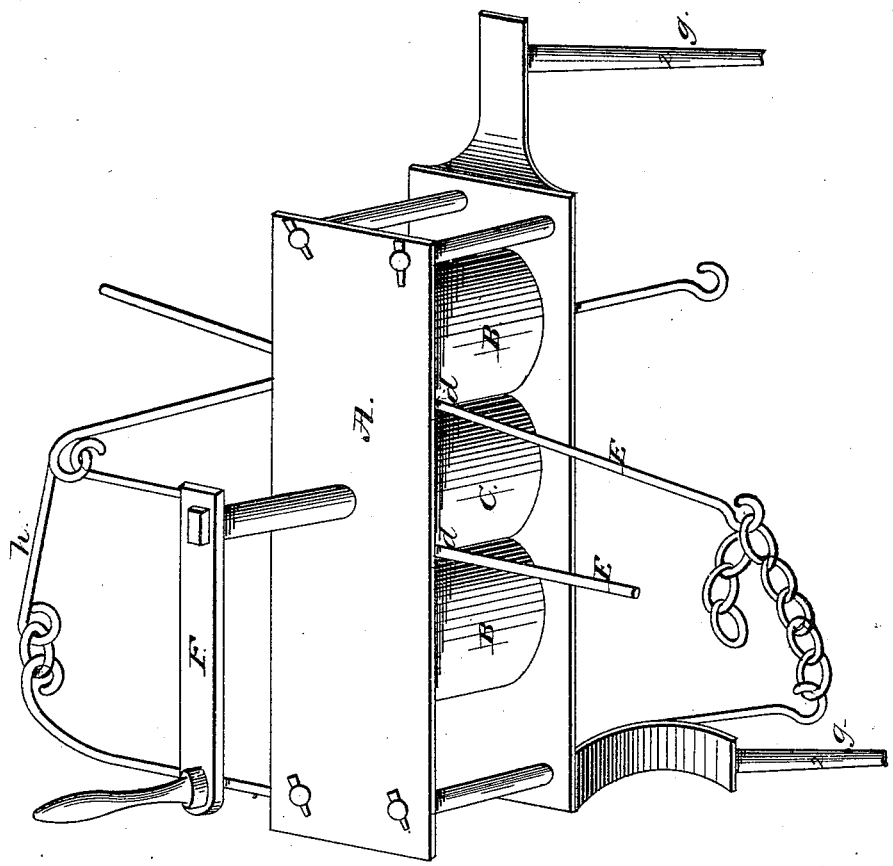
Witnesses:
Reuben R. Freeman
William Edgar Evans.
Inventor:
Solomon Clement Minear.

UNITED STATES PATENT OFFICE.

SOLOMON C. MINEAR, OF CHILLICOTHE, OHIO.

IMPROVEMENT IN MACHINES FOR COMPRESSING GRAIN-SHOCKS.

Specification forming part of Letters Patent No. 166,624, dated August 10, 1875; application filed April 23, 1875.

*To all whom it may concern:*

Be it known that I, SOLOMON CLEMENT MINEAR, of Chillicothe, in the county of Ross and State of Ohio, have invented certain new and useful Improvements in Machines for Compressing Grain-Shocks; and I do hereby declare that the following is a full, clear, and exact description thereof, which will enable others skilled in the art to which it pertains to make and use the same, reference being had to the accompanying drawings and to the letters of reference marked thereon, which form a part of this specification.

The nature of my invention consists in the construction and arrangement of a machine for tightening or compressing grain-shocks for tying, as will be hereinafter more fully set forth.

The annexed drawing, which fully illustrates my invention, represents a perspective view of my machine.

A represents the frame of my machine, provided with three legs or prongs, $g\ g$, for insertion in the shock to be tied. In the frame A is journaled a roller, C, the upper journal of which extends up through the frame, and is provided with a crank, F. On each side of the roller C is journaled another roller, B, and all the three rollers are provided with circumferential grooves $d$ of suitable width and depth, and in the same plane with each other.

In the operation of this machine, two rods, E E, are used, said rods having each at one end a hook or its equivalent, to be connected by means of chains or links $h$, substantially as shown. The legs or prongs $g$ are inserted in the shock, the links $h$ passed around the shock, and the rods E inserted from opposite directions in the grooves $d$ between the rollers, as shown. By now turning the crank F, the rods will be drawn through between the rollers in opposite directions, thereby tightening or compressing the shock. As soon as the shock is tied the crank F is reversed, loosening the links around the shock, when the machine is removed.

This machine may also be used in tightening wires for a variety of purposes.

Having thus fully described my invention, what I claim as new, and desire to secure by Letters Patent, is—

1. The combination of the rollers C and B B, provided with circumferential grooves $d$, and the rods E E, provided with connecting-links $h\ h$, substantially as and for the purposes herein set forth.

2. The combination of the frame A, legs or prongs $g$, grooved rollers C and B B, crank F, rods E, and connecting-links $h$, all substantially as and for the purposes herein at forth.

In testimony that I claim the foregoing as my own invention I affix my signature in presence of two witnesses.

SOLOMON CLEMENT MINEAR.

Witnesses:
 REUBEN R. FREEMAN,
 WILLIAM EDGAR EVANS.